United States Patent
Fan et al.

(10) Patent No.: US 9,526,098 B2
(45) Date of Patent: Dec. 20, 2016

(54) METHOD AND APPARATUS FOR DETERMINING INFORMATION ABOUT ACCESS BARRING

(71) Applicant: Xiaomi H.K. Ltd., Wanchai (HK)

(72) Inventors: Jianke Fan, Espoo (FI); Brian Martin, Surrey (GB)

(73) Assignee: XIAOMI H.K. LIMITED, Wanchai (HK)

( * ) Notice: Subject to any disclaimer, the term of this patent is extended or adjusted under 35 U.S.C. 154(b) by 238 days.

(21) Appl. No.: 13/875,633

(22) Filed: May 2, 2013

(65) Prior Publication Data
US 2013/0242955 A1    Sep. 19, 2013
US 2016/0302192 A9    Oct. 13, 2016

Related U.S. Application Data

(63) Continuation of application No. 13/365,544, filed on Feb. 3, 2012, now Pat. No. 8,478,286.

(30) Foreign Application Priority Data

Jan. 31, 2012    (GB) .................................. 1201661.4

(51) Int. Cl.
*H04H 20/67* (2008.01)
*H04W 72/04* (2009.01)
(Continued)

(52) U.S. Cl.
CPC ......... *H04W 72/0446* (2013.01); *H04W 48/02* (2013.01); *H04W 68/12* (2013.01);
(Continued)

(58) Field of Classification Search
CPC .. H04W 72/0446; H04W 48/02; H04W 68/12; H04W 72/1289; H04W 74/006; H04W 74/0833
See application file for complete search history.

(56) References Cited

U.S. PATENT DOCUMENTS 8,244,280 B2 *    8/2012  Willey ................ H04W 68/025
                                                     455/429
8,478,286 B1 *    7/2013  Fan ................... H04W 72/0446
                                                     455/410
(Continued)

FOREIGN PATENT DOCUMENTS

WO    2008094670    8/2008
WO    2010104994    9/2010
WO    2012020849    2/2012

OTHER PUBLICATIONS

3GPP TS 22.011 V10.2.0 (Dec. 2012) p. 1 section 4.3.4 of pp. 18-19.

*Primary Examiner* — Ayaz Sheikh
*Assistant Examiner* — Hai-Chang Hsiung
(74) *Attorney, Agent, or Firm* — Oblon, McClelland, Maier & Neustadt, L.L.P.

(57) ABSTRACT

A method for determining information about access barring includes the steps of: receiving a message set transmitted via a radio interface to a user equipment, the message set including at least a starting message that is a paging message; obtaining at least a first bit of a bit set from the starting message, wherein the bit set includes at least two bits and is intended for access barring; determining information of the bit set; the information at least disclosing whether the access barring is on or off; and receiving a system information block transmitted via the radio interface to the user equipment, the system information block comprising a scheduling information list that lists a further system information block that contains access barring parameters.

17 Claims, 3 Drawing Sheets

(51) Int. Cl.
*H04W 48/02* (2009.01)
*H04W 74/08* (2009.01)
*H04W 72/12* (2009.01)
*H04W 74/00* (2009.01)
*H04W 68/12* (2009.01)

(52) U.S. Cl.
CPC ...... *H04W 72/1289* (2013.01); *H04W 74/006* (2013.01); *H04W 74/0833* (2013.01)

(56) References Cited

U.S. PATENT DOCUMENTS

| | | | | |
|---|---|---|---|---|
| 8,937,907 B2* | 1/2015 | Ryu | ................ | H04W 52/0229 370/328 |
| 8,942,091 B2* | 1/2015 | Lin | ................ | H04W 48/08 370/229 |
| 9,078,257 B2* | 7/2015 | Fong | ................ | H04W 74/085 |
| 2009/0318142 A1 | 12/2009 | Choi et al. | | |
| 2013/0045706 A1* | 2/2013 | Hsu | ................ | H04W 48/02 455/404.1 |
| 2013/0051325 A1* | 2/2013 | Ryu | ................ | H04W 74/0833 370/328 |
| 2013/0115913 A1* | 5/2013 | Lin | ................ | H04W 48/08 455/410 |
| 2013/0121225 A1* | 5/2013 | Ryu | ................ | H04W 52/0229 370/311 |
| 2013/0128733 A1* | 5/2013 | Lee | ................ | H04W 74/02 370/230 |
| 2013/0170479 A1* | 7/2013 | Fong | ................ | H04W 72/0446 370/336 |
| 2013/0215742 A1* | 8/2013 | Sirotkin | ................ | H04W 28/0247 370/230 |
| 2014/0128029 A1* | 5/2014 | Fong | ................ | H04W 48/12 455/411 |
| 2014/0315554 A1* | 10/2014 | Hapsari | ................ | H04W 36/385 455/436 |
| 2015/0094020 A1* | 4/2015 | Lin | ................ | H04W 48/08 455/410 |

* cited by examiner

METHOD AND APPARATUS FOR DETERMINING INFORMATION ABOUT ACCESS BARRING

CROSS REFERENCE TO RELATED APPLICATION

This application is a continuation application under 35 USC §120 and 37 CFR 1.53(b) of co-pending U.S. patent application Ser. No. 13/365,544 (filed Feb. 3, 2012, now allowed), and also claims priority under 35 U.S.C. 119(a) and 37 CFR 1.55 from UK Patent Application Serial No. GB1201661.4 (filed Jan. 31, 2012).

TECHNICAL FIELD

The present invention relates to a method and apparatus for determining information about access barring. Some embodiments of the present invention relate generally to Radio Resource Control (RRC) in a radio access network (RAN). A Universal Mobile Telecommunication System (UMTS) network and a long term evolution (LTE) network are some examples of RAN.

BACKGROUND

The present application relates to RAN overload control. Important background information to the invention may be found in the 3rd Generation Partnership Project (3GPP) specification TS 22.011, section 4.3.4.

The RRC protocol layer provides functions such as broadcasting system information in a RAN. Based on the characteristics and uses of this information, the information elements are grouped together into a master information block (MIB) and different system information blocks (SIBs). The MIB is transferred on a broadcast channel every 40 ms and is repeated within 40 ms. A user equipment (UE) acquires the MIB to decode a shared channel. The MIB contains a downlink system bandwidth, a physical HARQ indicator channel, and a system frame number, wherein HARQ is an acronym for hybrid adaptive repeat and request.

SIB1 is the first system information block to be transferred after transferring MIB. It is scheduled in a fixed manner with a periodicity of 80 ms and is repeated within 80 ms. SIB1 contains cell-access-related information, information for cell selection, a frequency band indicator, etc. In addition, SIB1 contains SI-window length and a system information value tag. SIB1 is transmitted in a system information block message and the other SIBs are transmitted in system information (SI) messages. Each SI message is transmitted periodically in time domain windows, i.e. in SI-windows, and SI windows for different SI messages do not overlap. The length of SI-window defined in SIB1 is the same for all SI messages.

SIB2 contains radio resource configuration information common to all UEs. In more detail. SIB2 includes access barring information, radio resource configuration of common channels, and a lot of other information. SIB10 contains earthquake and tsunami warning system (ETWS) primary notification and SIB11 contains ETWS secondary notification by which users of UEs can be warned in case of an earthquake or a tsunami.

When the system information is updated, SI messages are repeated during modification periods. During the first modification period, the system information modification indicator is sent in a paging message to an UE, and during the next modification period, the RAN transmits the updated system information to the UE.

The UE verifies that its system information remains valid by either checking systemInfoValueTag in SystemInformationBlockType1 after the modification period boundary. Alternatively, the UE attempts to find systemInfoModification indication during a modification period. If no paging message is received by the UE during the modification period, the UE assumes that no change of system information will occur during the next modification period. If the UE is in RRC_CONNECTED mode and it receives the paging message, it deduces from the presence or absence of systemInfoModification whether a change of system information will occur in the next modification period or not.

As mentioned above, the SIB 2 includes the access barring information. In more detail, the SIB2 is used in access class barring (ACB) which is today's method to implement access barring in LTE networks. ACB comprises a number of parameters to indicate which of the access classes are currently barred and each UE should compare its access class to the barred access classes.

The maximum modification period during which the access barring information reaches UEs is calculated as: modificationPeriodCoeff×defaultPagingCycle. For example, the maximum modification period could be in radio frames (rf): 16×256 rf=4096 rf which requires 40960 ms. Thus, the access barring information reaches the UEs quite slowly. The delay associated with reading the updated system information (the access barring information) is not acceptable in some overload scenarios, in terms of being able to protect the RAN from excessive access attempts. The sudden surge in access attempts may happen because of an earthquake or a tsunami, but more probably because of smart metering, fleet management, civilian surveillance, etc. applications.

SUMMARY

In one embodiment of the present invention a method of informing a user equipment about access barring comprises the steps of:

determining a bit set for the access barring, wherein the bit set includes at least two bits and discloses at least whether the access barring is on or off;

placing at least a first bit of the bit set in a starting message, the starting message being one of the following messages: a master information block message or a paging message; and transmitting the bit set in a message set via a radio interface to the user equipment, the message set including at least the starting message.

In one embodiment of the present invention there is an apparatus, comprising:

at least one processor; and at least one memory including computer program code, the at least one memory and the computer program code configured to, with the at least one processor, cause the apparatus to perform at least the above-mentioned steps of the method of informing the user equipment about the access barring.

These two embodiments have at least one of following advantages: the access barring is flexible or the access barring operates fast. The access barring is flexible because it can be adjusted in many ways. The access barring operates very fast when it uses only the starting message, i.e. the master information block message or the paging message.

In one embodiment of the present invention there is an apparatus, comprising:

at least one processor; and at least one memory including computer program code, the at least one memory and the computer program code configured to, with the at least one processor, cause the apparatus to perform at least the following:

receiving a message set transmitted via a radio interface to a user equipment, the message set including at least a starting message that is a paging message;

obtaining at least a first bit of a bit set from the starting message, wherein the bit set includes at least two bits and is intended for access barring; and determining information of the bit set; the information at least disclosing whether the access barring is on or off; and receiving a system information block transmitted via the radio interface to the user equipment, the system information block comprising a scheduling information list that lists a further system information block that contains access barring parameters.

This embodiment of the present invention intended for receiving the message set transmitted via the radio interface have at least one of following advantages: the access barring is flexible in the user equipment or the access barring can be quickly set on in the user equipment. The access barring is flexible because it can be adjusted in many ways. The access barring operates very fast when it is set on by the starting message. Various aspects of embodiments and examples of the present invention are set out in the claims.

In other embodiments of the present invention the method of claim 1 further comprises at least one of the following sub-substeps.

The step of determining the bit set comprises the sub-step of:

setting values into the bit set so that the bit set discloses at least one of access classes 0-9 to be barred.

The step of determining the bit set comprises the sub-step of:

setting values into the bit set so that the bit set discloses at least one of access classes 0-9 to be released.

The step of determining the bit set comprises the sub-step of:

setting values into the bit set so that that bit set includes a category parameter, the category parameter disclosing at least one category of categories A, B, and C to which the access barring is applied.

The step of determining the bit set comprises the sub-step of:

setting values into the bit set so that the bit set includes a network parameter, the network parameter disclosing at least one public land mobile network to which the access barring is applied.

The step of determining the bit set comprises the sub-step of:

setting values into the bit set so that the bit set includes a domain parameter disclosing a domain set to which the access barring is applied; the domain set including at least one of the following domains: a circuit switched domain, a packet switched domain.

The step of determining the bit set comprises the sub-step of:

setting values into the bit set so that the bit set discloses information of the access barring to be updated.

The step of transmitting the bit set comprises the sub-steps of:

transmitting a system information block message to the user equipment; and transmitting at least a part of the bit set to the user equipment by using a system information message determined in the system information block message.

In other embodiments of the present invention the apparatus operating in the RAN is caused to perform at least one of the following operations.

The apparatus is caused to perform: setting values into the bit set so that that bit set includes a category parameter, the category parameter disclosing at least one category of categories A, B, and C to which the access barring is applied.

The apparatus is caused to perform: setting values into the bit set so that the bit set discloses information of the access barring to be updated.

The apparatus is caused to perform: transmitting a system information block message to the user equipment; and transmitting at least a part of the bit set to the user equipment by using a system information message specified in the system information block message.

The apparatus is caused to perform: determining on the basis of values of the bit set that at least one of access classes 0-9 is barred.

The apparatus is caused to perform: determining on the basis of values of the bit set that at least one of access classes 0-9 is released.

The apparatus is caused to perform: detecting in the bit set a category parameter, the category parameter disclosing at least one category of categories A, B, and C to which the access barring is applied.

In other embodiments of the present invention the apparatus operating in the RAN is caused to perform at least one of the following operations.

The apparatus is caused to perform: detecting in the bit set a network parameter, the network parameter disclosing at least one public land mobile network to which the access barring is applied.

The apparatus is caused to perform: detecting in the bit set a domain parameter, the domain parameter disclosing a domain set to which the access barring is applied; the domain set including at least one of the following domains: a circuit switched domain, a packet switched domain.

The apparatus is caused to perform: determining on the basis of the bit set that the access barring is updated.

The apparatus is caused to perform: receiving a system information block message; receiving a system information message defined in the system information block message; and obtaining at least a part of the bit set from the system information message.

BRIEF DESCRIPTION OF THE DRAWINGS

For a more complete understanding of examples and embodiments of the present invention, reference is now made to the following descriptions taken in connection with the accompanying drawings in which.

DETAILED DESCRIPTION

The term "bit set" used in the embodiments of the present invention refers to a set of bits which are transmitted via a radio interface to UEs in order to bar access attempts from the UEs. When the number of UEs is N, the access barring concerns 0-N UEs. In some embodiments all the bits are transmitted in one message and in some other embodiments the bits are transmitted in different messages. Basically, the number of bits is unlimited, but 18 bits or less is enough in most embodiments.

The invention can be implemented in a network side and in a user equipment side. In the network side it can be implemented in a base station, or in more specific, in eNodeB, but there are other possibilities, too.

Figure 1:
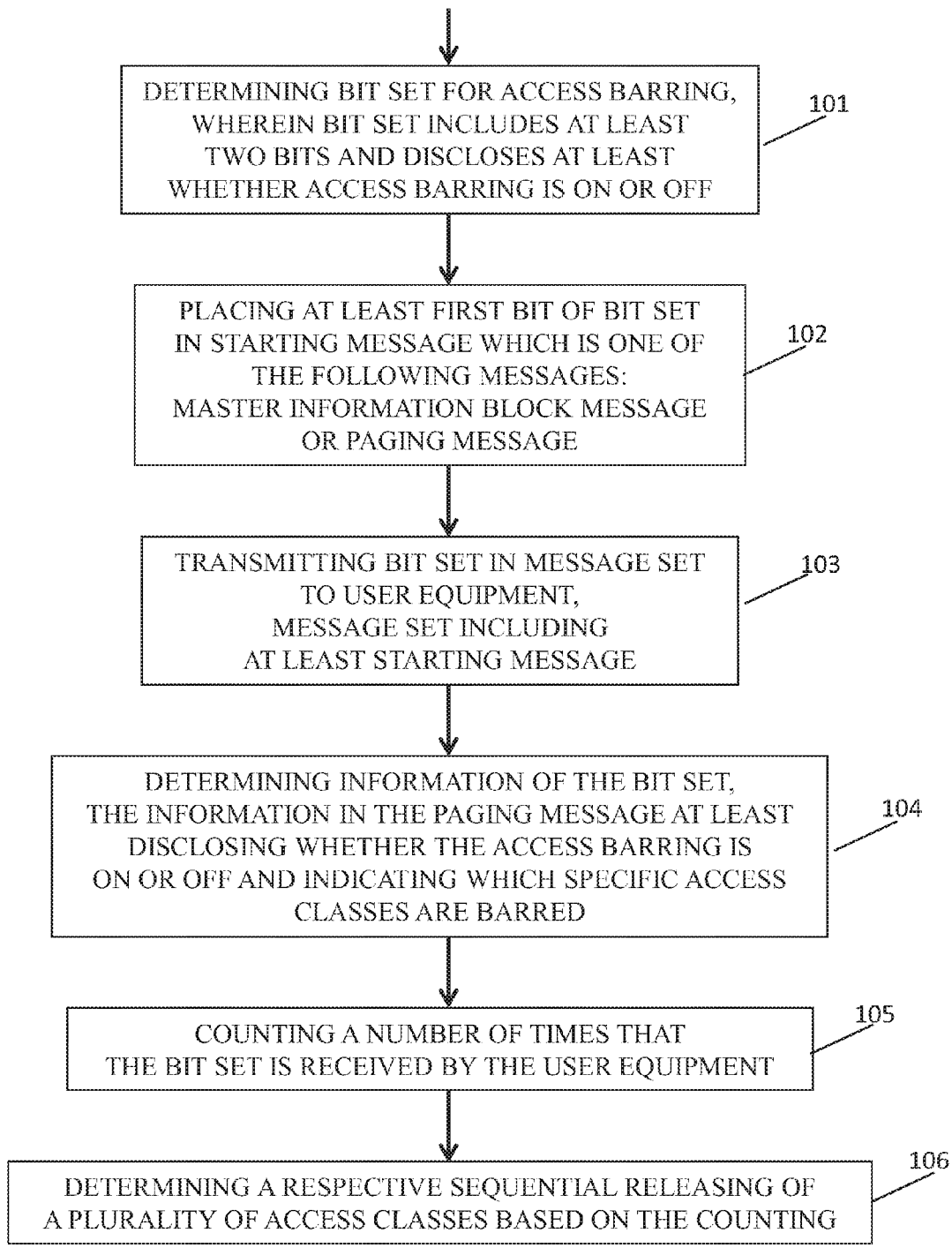
FIG. 1 illustrates a method in one embodiment of the present invention, the method performing access barring by transmitting a bit set via a radio interface to a user equipment.
Figure 2:
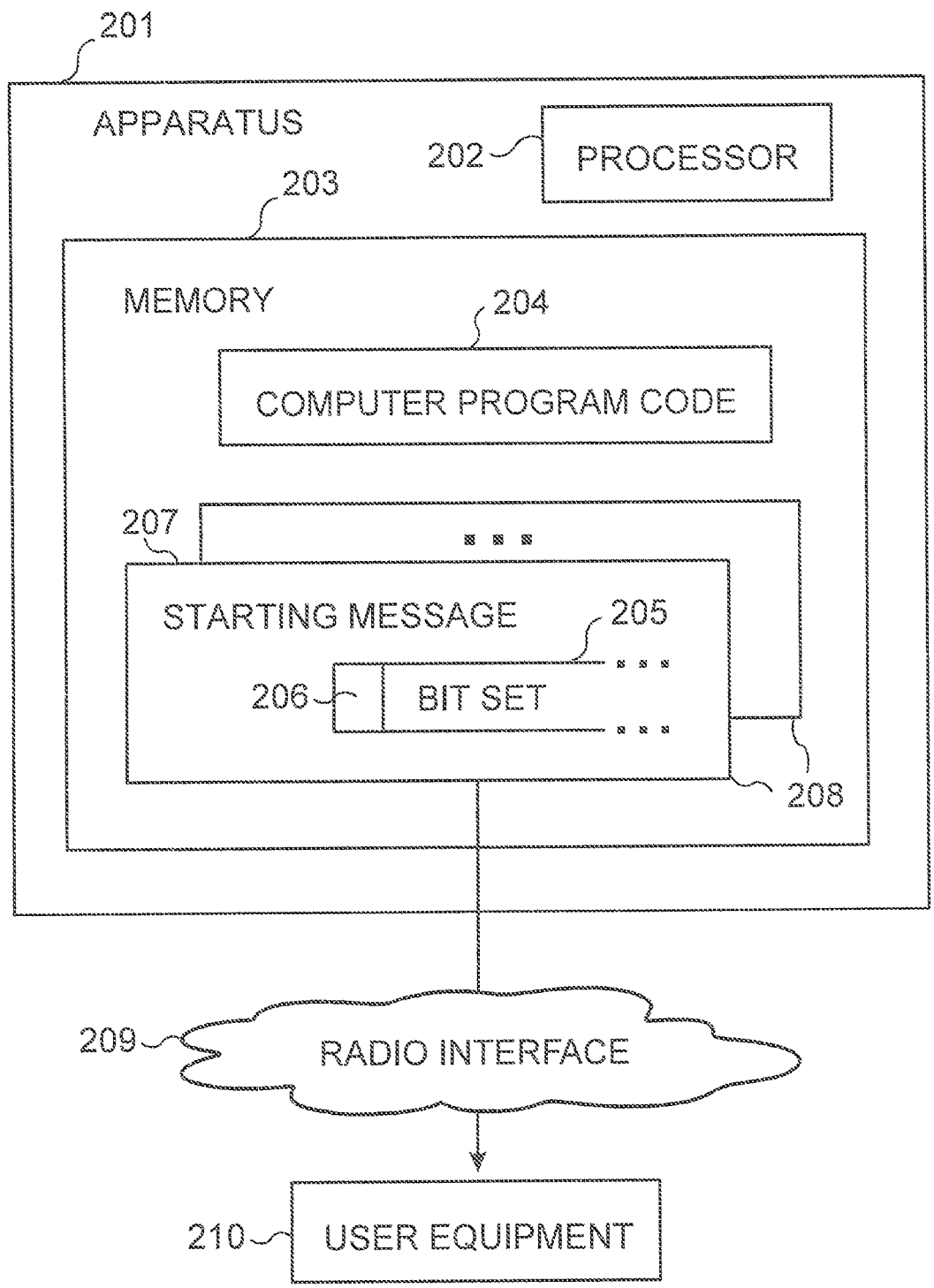
FIG. 2 illustrates an apparatus in one embodiment of the present invention, the apparatus performing access barring by transmitting a bit set via a radio interface to a user equipment.
Figure 3:
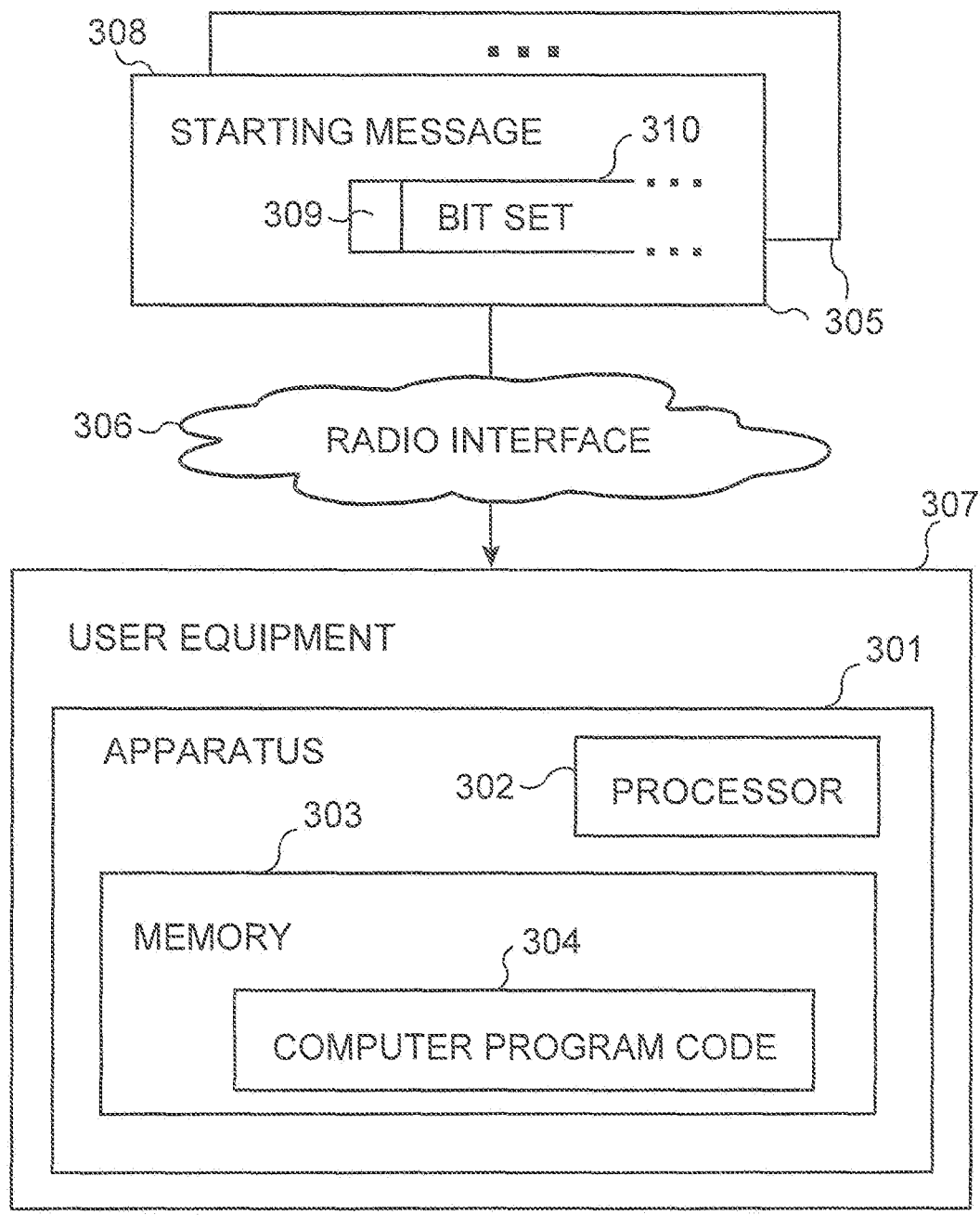
FIG. 3 illustrates an apparatus in one embodiment of the present invention, the apparatus performing access barring by receiving a bit set from a radio interface.

An example embodiment of the present invention and its potential advantages is understood by referring to FIGS. 1 to 3 of the drawings.

FIG. 1 illustrates a method of informing a user equipment about access barring, the method comprising the steps of:
  determining 101 a bit set for the access barring, wherein the bit set includes at least two bits and discloses at least whether the access barring is on or off;
  placing 102 at least a first bit of the bit set in a starting message, the starting message being one the following messages: a master information block message or a paging message;
  transmitting 103 the bit set in a message set via a radio Interface to the user equipment, the message set including at least the starting message;
  determining 104 information of the bit set, the information in the paging message at least disclosing whether the access barring is on or off and indicating which specific access classes are barred;
  counting 105 a number of times that the bit set is received by the user equipment; and
  determining 106 a respective sequential releasing of a plurality of access classes based on the counting.

In an embodiment of the present invention related to barring access classes, an apparatus performing the method sets values into the bit set so that the bit set discloses at least one of access classes 0-9 to be barred.

In an embodiment of the present invention related to releasing access classes, the apparatus sets values into the bit set so that the bit set discloses at least one of access classes 0-9 to be released.

The above-mentioned embodiment related to barring the access classes and the above-mentioned embodiment related to releasing the access classes enable very flexible access barring and, if needed, they also enable very fast access barring. In these embodiments the bit set discloses which access classes are barred. When the bit set includes two bits, the values of the bit set disclose, for example, the following information:
  00=barring off,
  01=access classes 0-4 barred (50% barring),
  10=access classes 0-9 barred (100% barring),
  11=re-acquire information of the access barring.
Alternatively, the values 01 and 10 indicate, for example, the following information:
  01=access classes 0-4 free, access classes 5-9 barred,
  10=access classes 5-9 free, access classes 0-4 barred, Alternatively, the values 01 and 10 may indicate the following:
  01=one access class is released, starting from access class 0,
  10=access classes 0-9 barred (100% barring).

In this example, an UE needs to count how many times it has received the bit set with values 01. The first time, it determines that access class 0 is released, i.e. UEs having access class 0 are able to access the RAN. The second time, the UE determines that access class I is released. Finally, the tenth time, the last access class, i.e. access class 9, is released at the UE.

The bit set may include one bit for each access class 0-9, but then ten bits are needed to disclose which access classes are barred. When this patent application was written MIB included the spare bits. Those spare bits are useful in various purposes in future, thus they should not be wasted. As shown in the above examples, it is possible to implement a new kind of access barring by using only two bits.

The term "extended access barring" (EAB) refers to access barring that can be adjusted in various ways. EAB can also be understood as flexible access barring. When using EAB access classes to be barred are indicated in one way or other. In addition, EAB may include a category parameter, a network parameter, and/or a domain parameter. These parameters are discussed in the following.

In one embodiment of the present invention, the apparatus sets values into the bit set so that that bit set includes a category parameter, the category parameter disclosing at least one category of categories A, B, and C to which the access barring is applied. The categories are specified as follows:
  A) all devices are configured for the access barring;
  B) all such devices are configured for the access barring which fail to be a part of their Home Public Land Mobile Network (HPLMN) or Public Land Mobile Network (PLMN); and
  C) all such devices are configured for the access barring which fail to be a part of their HPLMN or ePLMN, or which fail to be a part of the PLMN that is listed as the most preferred PLMN in the country where UE is roaming.

The category parameter can be coded with two bits.

In one embodiment of the present invention the apparatus sets values into the bit set so that the bit set includes a network parameter, the network parameter disclosing at least one public land mobile network (PLMN) to which the access barring is applied. The UE may have access to a number of PLMNs and by the network parameter some of them (or all of them) can be barred from the UE. The network parameter can be coded with three bits.

In one embodiment of the present invention the apparatus sets values into the bit set so that the bit set includes a domain parameter disclosing a domain set to which the access barring is applied; the domain set including at least one of the following domains: a circuit switched domain, a packet switched domain. The parameter can be coded with two bits.

In one embodiment of the present invention the access barring is implemented with eight bits so that the bit set includes two bits for the on/off information and for the access classes (as illustrated in the above examples), two bit for the category parameter, three bits for the network parameter, and two bits for the domain information.

In one embodiment of the present invention, the apparatus sets a value into the first bit, the value informing that the access barring is on. In more detail, the apparatus uses one on/off bit and one updating bit to inform UE that there is updated access barring information to be read. This can be done in idle mode and connected mode. A MIB includes most of the frequently transmitted parameters. For example, if the on/off bit and the updating bit are on, the UE reads the updated access barring information that is placed in a new EAB SIB. The new EAB SIB is, for example, SIB14. Otherwise, if the on/off bit is on and updating bit is off, the UE does not read SIB14 but uses the previous SIB14 information. Otherwise, if the on/off bit is off, the UE discards the stored SIB14 and does not read a new SIB14.

In one embodiment of the present invention, the apparatus sets a value into the first bit, the value informing that the access barring is on. In more detail, the apparatus uses one on/off bit in MIB or paging and one updating bit to inform UE that there is updated access barring information to be read. This can be done in idle mode and connected mode. A MIB includes most of the frequently transmitted parameters. For example, if the on/off bit and the updating bit are on, the UE reads the updated access barring information that is placed in a new EAB SIB. The new EAB SIB is, for example, SIB14. Otherwise, if the on/off bit is on and updating bit is off, the UE does not read SIB14 but uses the previous SIB14 information. Otherwise, if the on/off bit is off, the UE discards the stored SIB14 and does not read a new SIB14. This kind of access barring is termed "EAB barring" and it is implemented, for example, in the following way:

00=No EAB barring; discard stored EAB information,
   10=EAB barring is on, no EAB Update, use previously read EAB information,
   11=EAB barring is on, read new EAB SIB information.

In one embodiment of the present invention the overload problem is alleviated by the EAB barring. In this embodiment evolved NodeB (eNB) sets value 0 into an access barring on/off bit to allow machine-type-communication user equipments (MTC UEs) to access the RAN, and the eNB set value 1 into an updating bit. The access barring on/off bit may be the first bit and the updating bit may be the second bit, but they can be coded in some other way, too. The updating bit keeps its value (value 1) for a fixed period that is, for example, 3 hours. When the fixed period ends, the updating bit is set value 0. In other words, value 0 is the default value at the MTC UEs, but the eNB can change the value 0 to 1 for the fixed period. This arrangement is one example of the flexibility of the access barring related to the invention. In more detail, it cuts power consumption at the MTC UEs. If an MTC UE tries to access the network in a period of 24 hours before it accesses the network, it would check MIB for EAB on/off and updating bit, the MTC UEs would always react to the instant of the network situation whenever before its access.

In one embodiment of the present invention, the apparatus sets values into the bit set, the values informing that the access barring is updated.

It is possible to have different access barring schemas in the same RAN. In addition to the known ACB (access class barring) schema that uses SIB2, it is possible to implement a fast EAB schema. The fast EAB schema is based on use of a starting message and EAB SIB (the terms "starting message" and "EAB SIB" are specified in the above).

In one embodiment of the present invention, the apparatus sets a value into the first bit of the bit set to inform that the fast EAB schema is enabled, and it places a part of the bit set in binary variables of SIB1. In more detail, the apparatus uses the first bit to enable an UE to obey the fast EAB schema, and it uses the binary variables schedulingInfoList and ValueTag in SIB1 to inform about changes in the access barring. This embodiment can be utilized in the idle mode and in the connected mode. When the EAB SIB is included in schedulingInfoList in SIB1, and ValueTag in SIB1 is updated, the UE will immediately read the EAB SIB. The number of bits for ValueTag is defined by the number of possible combinations of access barring parameter values within period T. Let us assume that the EAB SIB must disclose at most 16 different parameter values. Then four bits are enough to disclose the 16 values and thus ValueTag is composed of 4 bits. In addition, a default period is set in Timer. The default period is, for example 3 hours during which an updating bit has value 1. This bit has the following effect. When the updating bit carries value 1 the UE checks schedulingInfoList and ValueTag to determine whether the UE should read EAB SIB. When Timer expires, the updating bit is turned to 0 and the UE stops checking schedulingInfoList and ValueTag.

In one embodiment of the present invention at least two bits are used to indicate updating of EAB SIB in MIB or paging. The number of bits (2 or more) is defined by the number of possible combinations of the access barring parameter values within period T. This embodiment differs from the previous embodiment so that ValueTag is omitted, but as the previous embodiment, also this embodiment uses schedulingInfoList in SIB1. In more detail, an UE reads the indication bits and compares them to previously stored indication bits. If the compared bits differ from each other and if the EAB SIB is included in the schedulingInfoList in SIB1, the UE must to read EAB SIB. Otherwise, the UE doesn't read it. This embodiment as well as the previous embodiment cuts power consumption at MTC UEs.

For example, 4 bits can be used in MIB and paging in the following way:
   0000=No EAB barring; discard stored EAB info
   0001=EAB barring is on, read new EAB info
   0010=EAB barring is on, read new EAB info
   0011=EAB barring is on, read new EAB info
   . . .
   1110=EAB barring is on, read new EAB info
   1111=EAB barring is on, no EAB update use previous read EAB info Window size of EAB SIB is preferably the same as the window size of the other SIBs. Position of the new EAB SIB should be fixed in BCCH (Broadcast Control Channel). Configuration updating speed of EAB SIB may differ from the configuration updating speed of the other SIBs. It should be noticed that when a MIB message is used as the starting message, there is 40 ms the minimum delay before UEs receive the MIB message.

In one embodiment of the present invention, the apparatus sets values into the bit set, the values informing that the access barring is updated.

In one embodiment of the present invention, the apparatus sets a value into the first bit of the bit set to inform that the access barring is updated. In other words, the apparatus uses one updating bit to inform UE that there is updated access barring information to be read. This can be done in idle mode and connected mode. If the EAB SIB is included in schedulingInfoList in SIB1, and ValueTag is updated, the UE will immediately read the EAB SIB. MIB includes most of the frequently transmitted parameters. For example, if the updating bit is on, the UE reads the updated access barring information that is placed in a new EAB SIB (i.e. SIB14). Otherwise, if the updating bit is off, the UE uses the stored EAB SIB information.

In one embodiment of the present invention, the apparatus transmits a system information block message to the user equipment and then the apparatus transmits at least a part of the bit set to the user equipment by using a system information message determined in the system information block message.

FIG. 2 illustrates an apparatus 201, comprising:
at least one processor 202; and
at least one memory 203 including computer program code 204,
the at least one memory and the computer program code. The apparatus 201 determines a bit set 205 for the access barring, wherein the bit set includes at least two bits and discloses at least whether the access barring is on or off. Then the apparatus 201 places at least a first bit 206 of the bit set in a starting message 207, the starting message being one the following messages: a master information block message or a paging message; and finally the apparatus 201 transmits the bit set in a message set 208 via a radio interface 209 to a user equipment 210, the message set including at least the starting message. The apparatus 201 processes the bit set 205 in its memory 203. If it is possible to place the whole bit set 205 into the starting message 207, the apparatus 201 may do so, but in many embodiments the bit set 205 need to be divided into parts and transmit those parts in at least two messages to the user equipment 210.

The apparatus illustrated in FIG. 3 is preferably caused to perform the method steps mentioned in the above. Some embodiments of apparatus 201 are listed here. The apparatus 201 sets values into the bit set 205 so that that bit set includes a category parameter, the category parameter discloses at least one category of categories A, B, and C to which the access barring is applied. The apparatus 201 sets values into the bit set 205 so that the bit set discloses information of the access barring to be updated. The apparatus 201 transmits a system information block message to the user equipment 210 and it transmits at least a part of the bit set to the user equipment by using a system information message specified in the system information block message.

FIG. 3 illustrates an apparatus 301, comprising:
at least one processor 302; and
at least one memory 303 including computer program code 304.

The apparatus 301 is a user equipment 307 or it is a component of the user equipment 307. The apparatus operates in the following way. The apparatus 301 receives a message set 305 transmitted via a radio interface 306 to the user equipment 307, the message set including at least a starting message 308 that is one the following messages: a master information block message or a paging message. Then the apparatus 301 obtains at least a first bit 309 of a bit set 310 from the starting message, wherein the bit set includes at least two bits and is intended for access barring and finally the apparatus 301 determines information of the bit set. This information at least discloses whether the access barring is on or off.

The apparatus 301 is preferably adapted to perform also the following operations. The apparatus 301 determines on the basis of values of the bit set that at least one of access classes 0-9 is barred, or at least one of access classes 0-9 is released.

The apparatus 301 detects in the bit set 310 a category parameter, the category parameter disclosing at least one category of categories A, B, and C to which the access barring is applied.

The apparatus 301 detects in the bit set 310 a network parameter, the network parameter disclosing at least one public land mobile network to which the access barring is applied.

The apparatus 301 detects in the bit set 310 a domain parameter, the domain parameter disclosing a domain set to which the access barring is applied; the domain set including at least one of the following domains: a circuit switched domain, a packet switched domain.

The apparatus 301 determines on the basis of the bit set 310 that the access barring is updated. Then the apparatus 301 receives a system information block message and a system information message defined in the system information block message. Finally, the apparatus 301 obtains at least a part of the bit set from the system information message.

Relating to the all embodiments to the invention it should be noticed that each bit in the bit set to be transmitted to UEs may have a specific function or meaning. For example, the first bit of the bit set may disclose access barring on/of information. As a person skilled in the art knows, this is just one way to code the bit set. Any single bit in the bit set does not need to have a specific function or meaning. As shown in the examples, more than one bit can be interpreted when determining the information of the bit set.

The exemplary embodiments can include, for example, any suitable network devices, base stations, eNodeBs, RAN devices, laptop computers, Internet appliances, handheld devices, cellular telephones, smart phones, wireless devices, and the like, capable of performing the processes of the exemplary embodiments. The devices and subsystems of the exemplary embodiments can communicate with each other using any suitable protocol and can be implemented using one or more programmed computer systems or devices.

Embodiments of the present invention may be implemented in software, hardware, application logic or a combination of software, hardware and application logic.

In an example embodiment, the application logic, software or instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. The exemplary embodiments can store information relating to various processes described herein. This information can be stored in one or more memories, such as a hard disk, optical disk, magneto-optical disk, RAM, and the like.

All or a portion of the exemplary embodiments can be conveniently implemented using one or more general purpose processors, microprocessors, digital signal processors, micro-controllers, and the like, programmed according to the teachings of the exemplary embodiments of the present invention, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present invention can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program of an embodiment of the present invention for performing all or a portion (if processing is distributed) of the processing performed in implementing the present invention. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like.

While the present invention has been described in connection with a number of exemplary embodiments, and implementations, the present invention is not so limited, but rather covers various modifications, and equivalent arrangements, which fall within the purview of prospective claims.

We claim:

1. A method for determining information about access barring, the method comprising:
   receiving a message set transmitted via a radio interface to a user equipment, the message set including at least a starting message that is a paging message;
   obtaining at least a first bit of a bit set from the starting message, wherein the bit set includes at least two bits and is intended for access barring;
   determining information of the bit set, the information in the paging message at least disclosing whether the access barring is on or off and indicating which specific access classes are barred;
   receiving a system information block transmitted via the radio interface to the user equipment, the system information block comprising a scheduling information list that lists a further system information block that contains access barring parameters;
   counting, by the user equipment, a number of times that the bit set is received by the user equipment; and
   determining a respective sequential releasing of a plurality of access classes based on the counting.

2. The method of claim 1, further comprising:
   determining on a basis of values of the bit set which of access classes 0-9 is barred where the bit set is a maximum of two bits.

3. The method of claim 1, further comprising:
   detecting in the bit set a category parameter, the category parameter disclosing at least one category of categories A, B, and C to which the access barring is applied.

4. The method of claim 1, further comprising:
   detecting in the bit set a network parameter, the network parameter disclosing at least one public land mobile network to which the access barring is applied.

5. The method of claim 1, the method further comprising:
   detecting in the bit set a domain parameter, the domain parameter disclosing a domain set to which the access barring is applied; the domain set including at least one of the following domains: a circuit switched domain, a packet switched domain.

6. The method of claim 1, further comprising:
   determining on a basis of the bit set that the access barring is updated.

7. An apparatus for determining information about access barring, the apparatus comprising:
   circuitry configured to:
   receive a message set transmitted via a radio interface to a user equipment, the message set including at least a starting message that is a paging message;
   obtain at least a first bit of a bit set from the starting message, wherein the bit set includes at least two bits and is intended for access barring;
   determine information of the bit set, the information in the paging message at least disclosing whether the access barring is on or off and indicating which access classes are barred;
   receive a system information block transmitted via the radio interface to the user equipment, the system information block comprising a scheduling information list that lists a further system information block that contains access barring parameters;
   count, by the user equipment, a number of times that the bit set is received by the user equipment; and
   determine a respective sequential releasing of a plurality of access classes based on the counting.

8. The apparatus of claim 7, wherein the circuitry is further configured to:
   determine on a basis of values of the bit set which of access classes 0-9 is barred where the bit set is a maximum of two bits.

9. The apparatus of claim 7, wherein the circuitry is further configured to:
   detect in the bit set a category parameter, the category parameter disclosing at least one category of categories A, B, and C to which the access barring is applied.

10. The apparatus of claim 7, wherein the circuitry is further configured to:
    detecting in the bit set a network parameter, the network parameter disclosing at least one public land mobile network to which the access barring is applied.

11. The apparatus of claim 7, wherein the circuitry is further configured to:
    detect in the bit set a domain parameter, the domain parameter disclosing a domain set to which the access barring is applied; the domain set including at least one of the following domains: a circuit switched domain, a packet switched domain.

12. The apparatus of claim 7, wherein the circuitry is further configured to:
    determine on a basis of the bit set that the access barring is updated.

13. A non-transitory computer readable medium comprising a set of instructions tangibly stored thereon for determining information about access barring, which, when executed by a computer system, cause the system to perform a method comprising:
    receiving a message set transmitted via a radio interface to a user equipment, the message set including at least a starting message that is a paging message;
    obtaining at least a first bit of a bit set from the starting message, wherein the bit set includes at least two bits and is intended for access barring;

determining information of the bit set, the information in the paging message at least disclosing whether the access barring is on or off and indicating which access classes are barred;

receiving a system information block transmitted via the radio interface to the user equipment, the system information block comprising a scheduling information list that lists a further system information block that contains access barring parameters;

counting, by the user equipment, a number of times that the bit set is received by the user equipment; and determining a respective sequential releasing of a plurality of access classes based on the counting.

14. The non-transitory computer readable medium of claim 13, which when executed by a computer system cause the system further to:

determine on a basis of values of the bit set which of access classes 0-9 is barred where the bit set is a maximum of two bits.

15. The non-transitory computer readable medium of claim 13, which when executed by a computer system cause the system further to:

detect in the bit set a category parameter, the category parameter disclosing at least one category of categories A, B, and C to which the access barring is applied.

16. The non-transitory computer readable medium of claim 13, which when executed by a computer system cause the system further to:

detect in the bit set a network parameter, the network parameter disclosing at least one public land mobile network to which the access barring is applied.

17. The non-transitory computer readable medium of claim 13, which when executed by a computer system cause the system further to:

detect in the bit set a domain parameter, the domain parameter disclosing a domain set to which the access barring is applied; the domain set including at least one of the following domains: a circuit switched domain, a packet switched domain.

* * * * *